United States Patent Office 2,911,428
Patented Nov. 3, 1959

2,911,428

HALOCYCLOBUTYL SUBSTITUTED ORGANO-SILICON COMPOUNDS

Paul Tarrant, Gainesville, Fla., assignor, by mesne assignments, to Dow Corning Corporation, Midland, Mich., a corporation of Michigan No Drawing. Application July 16, 1958
Serial No. 748,815

9 Claims. (Cl. 260—448.2)

This invention relates to organosilanes and siloxanes containing (chlorohexafluorocyclobutyl) ethyl groups attached to silicon.

It is an object of this invention to provide novel organosilicon compounds which are useful as lubricants, water repellent agents, and dielectric fluids. A further object is the provision of novel compounds which are useful as siloxane resins and rubbers having increased solvent resistance.

The compounds of this invention can be either monomeric or polymeric in form. The monomers have the formula $$(ClCFCF_2CF_2CFCH_2CH_2)_xR_ySiY_{4-x-y}$$
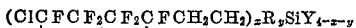

where R is a monovalent hydrocarbon radical free of aliphatic unsaturation, Y is selected from the group consisting of Cl and Br atoms and OR′ radicals where R′ is selected from the group consisting of alkyl and aryl radicals, $x$ is an integer of from 1 to 2 inclusive and $y$ is an integer of from 0 to 3 inclusive.

The polymers of this invention include both homopolymers and copolymers. They are prepared by the hydrolysis and condensation or cohydrolysis and cocondensation of one or more of those of the above-defined monomers which contain at least one Y radical, or by cohydrolysis and cocondensation of such monomers with other conventional hydrolyzable organosilanes. Thus the polymers include those in which the polymeric units consist essentially of units of the formula $$(ClCFCF_2CF_2CFCH_2CH_2)_xR_zSiO_{\frac{4-x-z}{2}}$$
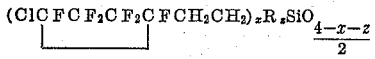

where R and $x$ are as above defined, $z$ is from 0 to 2 inclusive, and the sum of $x$ and $z$ is not greater than 3, and copolymers of the above-defined polymeric units in which any remaining polymeric units consist essentially of units of the formula $$R''_nSiO_{\frac{4-n}{2}}$$
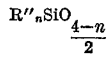

where R″ is a monovalent hydrocarbon radical or a chlorinated or brominated derivative thereof and $n$ is an integer of from 1 to 3 inclusive. Preferably any such copolymer contains at least 0.1 molar percent of the former units.

The monomers of this invention wherein Y is Cl or Br are best prepared by reacting the olefin $$ClCFCF_2CF_2CFCH=CH_2$$
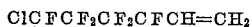

with a silane of the formula $R_yH_xSiX_{4-x-y}$ where R, $y$ and $x$ are as above-defined, and X is Cl or Br. This reaction is best carried out at a temperature of from 150 to 300° C. It can be carried out in either the presence or absence of a catalyst. The preferred catalysts for the reaction are chloroplatinic acid and platinum deposited on charcoal. Any or all of the X radicals in compounds prepared in this manner can be replaced by R groups by reacting the adduct with a Grignard reagent, e.g. RMgCl.

For the purpose of this invention R can be any monovalent hydrocarbon radical free of aliphatic unsaturation. Illustrative examples of suitable radicals include alkyl radicals such as methyl, ethyl, isopropyl and octadecyl; aryl radicals such as phenyl, xenyl and naphthyl; alkaryl radicals such as xylyl and tolyl; aralkyl radicals such as benzyl; and cycloaliphatic radicals such as cyclohexyl. Thus, the silane reactants used herein include the compounds $RHSiCl_2$, $RHSiBr_2$, $R_2HSiCl$, $RH_2SiCl$, $R_2SiH_2$, $R_3SiH$, $HSiCl_3$, $HSiBr_3$, and $H_2SiCl_2$ where each R is any of the above illustrative radicals and can be the same or different radicals on each Si atom.

The compounds in which Y is the OR′ radical can be prepared by reacting the chloro- or bromosilane product from the above-described reaction with the corresponding sodium alcoholate, phenolate, or substituted phenolate. Preferably R′ is a radical containing no more than 10 carbon atoms. The sodium derivative of methanol, ethanol, and phenol are preferred.

The organosiloxanes of this invention can be prepared by the hydrolysis and condensation of any of the above-described monomeric silane products which contain at least one Y radical. Copolymers can be prepared by the cohydrolysis and cocondensation of any two or more of these monomeric products, or by the cohydrolysis and cocondensation of any one or more of such monomers with conventional organosilanes such as those of the formula $R''_nSiCl_{4-n}$ where R″ and $n$ are as described above. Examples of suitable R″ radicals include all of the illustrative radicals described above in regard to the R radicals, as well as radicals containing aliphatic unsaturation such as vinyl, allyl, propargyl, and cyclohexenyl. R″ can also be any of the chlorinated or brominated derivatives of the previously described illustrative radicals. Particularly preferred examples of such radicals are chlorophenyl, dichlorophenyl, bromophenyl and dibromophenyl radicals.

The hydrolysis and condensation techniques used in preparing the organosiloxanes of this invention are those which are well known in the hydrolysis of conventional organosilanes. If desired, the hydrolysis can be carried out in the presence of inert solvents such as ether, toluene, xylene or other hydrocarbons. The polymers and copolymers can of course contain small amounts of uncondensed silicon-bonded OH groups and/or unhydrolyzed Y radicals, as is conventional in silicone polymers.

The olefin used in the preparation of the defined compounds can itself be prepared in the following manner: The compounds $CF_2=CFCH_2CH_2Br$ and $CF_2=CFCl$ in approximately equimolar proportions are heated at about 200° C. for 17 hours. The reaction product is washed with water, dried, and distilled to yield the compound $$CFClCF_2CF_2CFCH_2CH_2Br$$
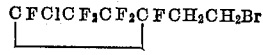

as a fraction boiling at about 145 to 150° C. The latter compound is then dehydrobrominated by adding thereto an equimolar amount of KOH in the form of a solution in 95% ethanol. The reaction mass is filtered to remove precipitated KBr and the filtrate heated at reflux for 0.5 hour, then the ethanol removed by distillation. The mass is then washed with water and the non-aqueous layer is dried and fractionated to give the desired compound $$CFClCF_2CF_2CFCH=CH_2$$
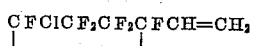

B.P. 83° C., $n_D^{22}$ 1.3468, $d_4^{22}$ 1.4206.

The monomeric silanes of this invention which contain Y radicals are useful for rendering materials such as ceramics, masonry and textiles water repellent. The monomers containing no Y radicals can be used as lubricants, hydraulic fluids, or as additives to organosiloxane fluids to improve the properties of the latter. The organosiloxanes of this invention are useful as solvent resistant resins and rubbers. In the preparation of rubbery materials from such organosiloxanes, conventional fillers such as silica, and conventional vulcanizing agents may be used.

The following examples are illustrative only. All parts are parts by weight unless otherwise specified. The symbols Et, Me and Ph are used to represent ethyl, methyl and phenyl radicals respectively.

*Example 1*

An autoclave was charged with 89 parts

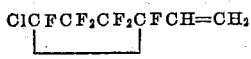

215 parts MeHSiCl$_2$ and 0.5 part of a catalyst consisting of 5% platinum deposited on powdered charcoal. The mixture was agitated and heated for 12 hours at 200° C. The reaction mass was fractionated to provide the product

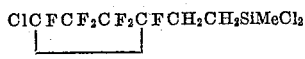

B.P. 180 to 182° C., $n_D^{24}$ 1.3909.

*Example 2*

When the product of Example 1 is mixed with an equal weight of toluene and added to an excess of water, then the hydrolyzate heated at reflux, washed free of acid, and distilled free of toluene, the resulting oily polymer contains the cyclic trimer

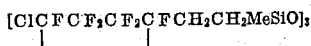

the cyclic tetramer

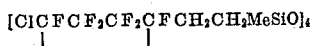

and higher linear and cyclic polymers of the same unit formula.

*Example 3*

When

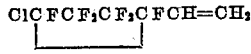

is reacted in the manner of Example 1 with the silanes listed below, the corresponding reaction products listed below are obtained.

| Silane | Product |
| --- | --- |
| Me$_2$HSiCl | ClCFCF$_2$CF$_2$CFCH$_2$CH$_2$SiMe$_2$Cl |
| MeEtHSiCl | ClCFCF$_2$CF$_2$CFCH$_2$CH$_2$SiMeEtCl |
| PhHSiCl$_2$ | ClCFCF$_2$CF$_2$CFCH$_2$CH$_2$SiPhCl$_2$ |
| HSiCl$_3$ | ClCFCF$_2$CF$_2$CFCH$_2$CH$_2$SiCl$_3$ |
| MeHSiBr$_2$ | ClCFCF$_2$CF$_2$CFCH$_2$CH$_2$SiMeBr$_2$ |
| H$_2$SiCl$_2$ | [ClCFCF$_2$CF$_2$CFCH$_2$CH$_2$]$_2$SiCl$_2$ |

*Example 4*

When

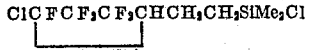

is reacted with an equimolar amount of PhMgCl in diethyl ether,

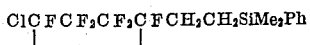

is obtained.

*Example 5*

When an equimolar mixture of

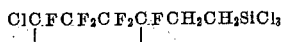

MeSiCl$_3$, PhSiCl$_3$, and PhMeSiCl$_2$ is mixed with an equal weight of toluene, hydrolyzed by adding the solution to an excess of water, then the hydrolyzate refluxed and washed free of acid, a resinous copolymer is obtained which consists essentially of units of the formulae

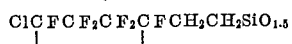

MeSiO$_{1.5}$, PhSiO$_{1.5}$ and PhMeSiO.

*Example 6*

When one mol of

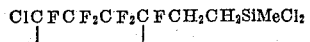

is mixed with two mols of sodium ethylate or phenolate, the corresponding diethoxy or diphenoxy derivatives are respectively obtained.

*Example 7*

When

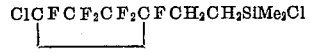

is hydrolyzed and the hydrolyzate condensed as in Example 2, the disiloxane

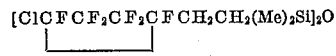

is obtained. Cohydrolysis of the above silane with Me$_2$SiCl$_2$ in the same manner produces endblocked polymers of the general formula QO(Me$_2$SiO)$_m$Q (as well as the above disiloxane and polymers of Me$_2$SiO units) where Q is the

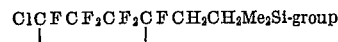

Likewise, when

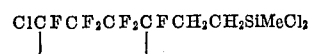

is cohydrolyzed with Me$_2$SiCl$_2$, copolymers of Me$_2$SiO and

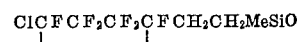

units are produced.

That which is claimed is:

1. An organosilane having the formula

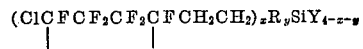

where R is a monovalent hydrocarbon radical free of aliphatic unsaturation, Y is selected from the group consisting of Cl and Br atoms and OR' radicals where R' is selected from the group consisting of alkyl and aryl radicals, $x$ is an integer of from 1 to 2 inclusive and $y$ is an integer of from 0 to 3 inclusive.

2. An organosilane of the formula

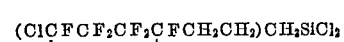

3. An organosilane of the formula

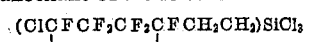

4. An organosilane of the formula $$(ClCFCF_2CF_2CFCH_2CH_2)Si(CH_3)_2Cl$$
with Cl-C...C-F bridge 5. An organosiloxane consisting essentially of units of the formula $$(ClCFCF_2CF_2CFCH_2CH_2)_xR_zSiO_{\frac{4-x-z}{2}}$$

where R is a monovalent hydrocarbon radical free of aliphatic unsaturation, $x$ is an integer of from 1 to 2 inclusive, $z$ is an integer of from 0 to 2 inclusive and the sum of $x$ and $z$ is not greater than 3.

6. An organosiloxane consisting essentially of polymeric units of the formula.

$$(ClCFCF_2CF_2CFCH_2CH_2)(CH_3)SiO$$

7. An organosiloxane of the formula $$[(ClCFCF_2CF_2CFCH_2CH_2)(CH_3)SiO]_3$$

8. An organosiloxane of the formula $$[(ClCFCF_2CF_2CFCH_2CH_2)(CH_3)SiO]_4$$

9. A copolymeric organosiloxane in which at least 0.1 mol percent of the polymeric units are of the formula $$(ClCFCF_2CF_2CFCH_2CH_2)_xR_zSiO_{\frac{4-x-z}{2}}$$

where R is a monovalent hydrocarbon radical free of aliphatic unsaturation, $x$ is an integer of from 1 to 2 inclusive, $z$ is an integer of from 0 to 2 inclusive and the sum of $x$ and $z$ is not greater than 3, any remaining polymeric units consisting essentially of units of the formula $$R''_nSiO_{\frac{4-n}{2}}$$

where R" is selected from the group consisting of monovalent hydrocarbon radicals and chlorinated and brominated derivatives thereof, and $n$ is an integer of from 1 to 3 inclusive.

References Cited in the file of this patent

UNITED STATES PATENTS 2,596,967    Frost ------------------ May 20, 1952

FOREIGN PATENTS 760,201    Great Britain ------------ Dec. 6, 1954

UNITED STATES PATENT OFFICE
CERTIFICATE OF CORRECTION

Patent No. 2,911,428

November 3, 1959

Paul Tarrant

It is hereby certified that error appears in the printed specification of the above numbered patent requiring correction and that the said Letters Patent should read as corrected below.

Column 3, Example 3, in the table, second column thereof, the third product should read as shown below instead of as in the patent:

same column 3, lines 74 and 75, Example 4, the formula should read as shown below instead of as in the patent:

Signed and sealed this 26th day of April 1960.

(SEAL)
Attest:

KARL H. AXLINE
Attesting Officer

ROBERT C. WATSON
Commissioner of Patents